US012570882B2

(12) United States Patent
Kimura et al.

(10) Patent No.: US 12,570,882 B2
(45) Date of Patent: Mar. 10, 2026

(54) PHOTOCURABLE SILICONE COMPOSITION, ADHESIVE, AND SILICONE CURED MATERIAL

(71) Applicant: SHIN-ETSU CHEMICAL CO., LTD., Tokyo (JP)

(72) Inventors: Shinji Kimura, Annaka (JP); Toshiyuki Ozai, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 662 days.

(21) Appl. No.: 17/922,651

(22) PCT Filed: Mar. 30, 2021

(86) PCT No.: PCT/JP2021/013678

§ 371 (c)(1),
(2) Date: Nov. 1, 2022

(87) PCT Pub. No.: WO2021/229944

PCT Pub. Date: Nov. 18, 2021

(65) Prior Publication Data

US 2023/0167344 A1 Jun. 1, 2023

(30) Foreign Application Priority Data

May 11, 2020 (JP) ................................ 2020-083043

(51) Int. Cl.

| | |
|---|---|
| ***C08G 77/48*** | (2006.01) |
| ***C08L 83/16*** | (2006.01) |
| ***C09J 11/04*** | (2006.01) |
| ***C09J 11/06*** | (2006.01) |
| ***C09J 183/04*** | (2006.01) |
| *C08L 83/14* | (2006.01) |

(52) U.S. Cl.

CPC ............ *C09J 183/04* (2013.01); *C08L 83/16* (2013.01); *C09J 11/04* (2013.01); *C09J 11/06* (2013.01); *C08G 77/48* (2013.01); *C08L 83/14* (2013.01); *C09J 2400/16* (2013.01); *C09J 2483/00* (2013.01)

(58) Field of Classification Search

CPC .......... C08L 83/04; C08L 83/14; C08G 77/48
USPC ........................................................... 528/15
See application file for complete search history.

(56) References Cited

U.S. PATENT DOCUMENTS

| | | | | |
|---|---|---|---|---|
| 6,201,092 | B1 | 3/2001 | Hara | |
| 11,492,504 | B2 * | 11/2022 | Wang | B29C 64/112 |
| 11,976,172 | B2 * | 5/2024 | Li | C08G 77/20 |
| 2008/0176086 | A1 | 7/2008 | Irifune | |
| 2013/0072592 | A1 | 3/2013 | Inafuku et al. | |
| 2015/0124338 | A1 | 5/2015 | Mayumi et al. | |
| 2015/0166458 | A1 | 6/2015 | Hase et al. | |
| 2016/0068720 | A1 | 3/2016 | Zhang et al. | |
| 2017/0283677 | A1 | 10/2017 | Iwata | |
| 2019/0002695 | A1 | 1/2019 | Pibre et al. | |
| 2019/0092951 | A1 * | 3/2019 | Wang | C09D 11/102 |
| 2020/0332069 | A1 * | 10/2020 | Li | C08G 77/20 |

FOREIGN PATENT DOCUMENTS

| | | | |
|---|---|---|---|
| EP | 2570463 | A1 | 3/2013 |
| JP | H11-335564 | A | 12/1999 |
| JP | 2001-064593 | A | 3/2001 |
| JP | 2005-040749 | A | 2/2005 |
| JP | 3894873 | B2 | 3/2007 |
| JP | 2008-195931 | A | 8/2008 |
| JP | 2012-193286 | A | 10/2012 |
| JP | 2013-203794 | A | 10/2013 |
| JP | 2013-253166 | A | 12/2013 |
| JP | 5735446 | B2 | 6/2015 |
| JP | 2016-529342 | A | 9/2016 |
| JP | 2018-076415 | A | 5/2018 |
| JP | 2019-507205 | A | 3/2019 |
| JP | 2019-108471 | A | 7/2019 |

OTHER PUBLICATIONS

Jun. 16, 2023 Office Action and Search Report issued in Chinese Patent Application No. 202180032492.0.
Nov. 15, 2022 International Preliminary Report on Patentability Issued in International Patent Application No. PCT/JP2021/013678.
Jun. 15, 2021 International Search Report Issued in International Patent Application No. PCT/JP2021/013678.
Mar. 30, 2022 Office Action Issued in Taiwanese Patent Application No. 110112284.
Mar. 22, 2023 Office Action issued in Japanese Patent Application No. 2020-083043.
Dec. 2, 2025 Office Action issued in Korean Patent Application No. 10-2022-7038485 (with partial translation).

* cited by examiner

*Primary Examiner* — Margaret G Moore
(74) *Attorney, Agent, or Firm* — Oliff PLC

(57) ABSTRACT

A photocurable silicone composition, containing: (A) an organopolysiloxane having at least one specific structure having a (meth)acryl group in the molecule; (B) an organohydrogenpolysiloxane having at least two hydrogen atoms bonded to a silicon atom in one molecule; (C) a photoradical polymerization initiator; and (D) a platinum-group metal catalyst to be activated by light having a wavelength of 200 to 500 nm. The photocurable silicone composition has good storability, and good surface curability and deep-part curability in the air; an adhesive consisting of this photocurable silicone composition; and a cured material of this photocurable silicone composition.

6 Claims, No Drawings

PHOTOCURABLE SILICONE COMPOSITION, ADHESIVE, AND SILICONE CURED MATERIAL

TECHNICAL FIELD

The present invention relates to a photocurable silicone composition, an adhesive consisting of the photocurable silicone composition, and a cured material of the photocurable silicone composition.

BACKGROUND ART

In manufacturing processes, simplification and cost reduction, which coincide with environmentally friendly energy-saving consciousness, have been proactively progressed in various fields. In particular, many processes for manufacturing optical, electric, and electronic devices, and displays are associated with heating processes at high temperature requiring huge amount of energy, time, and equipment for curing adhesive, sealing, embedding materials, etc. Thus, these processes have been required to be improved. The improvement of this heating process has great significance in terms of not only energy or cost but also manufacturing technology for not damaging other members.

To solve these problems, an ultraviolet-ray curable composition has attracted attention in recent years. The ultraviolet-ray curable composition, which contains a photoinitiator to be activated by ultraviolet-ray irradiation, proceeds a polymerization or crosslinking reaction with this initiator to be cured within a time as short as, typically, several tens of seconds to over ten minutes. Accordingly, the ultraviolet-ray curable composition hardly damages other members, and does not require large equipment. An ultraviolet-ray irradiation device utilizing an LED has recently been developed, which provides an excellent manufacturing process.

Proposed on an ultraviolet-ray curable silicone composition are a method using a photo-cation polymerization (Patent Document 1), a method using a radical polymerization (Patent Document 2), etc. With the former method, the composition contains an onium salt to generate an acid with the ultraviolet-ray irradiation. Thus, when the composition is used for, for example, an electric or electronic substrate, corrosion of the substrate is concerned. The latter method has a high reaction rate because of its high reaction activity, and the curing is achieved in a short time. On the other hand, a radical, which has an extremely short lifetime, is easily deactivated by oxygen, etc. As a result, curability on a composition surface contacted with the air may be considerably deteriorated.

For the above-described problems of curing inhibition, sensitizers are often is considered as additives (e.g., Patent Documents 3, 4, and 5). However, these methods improve each reactivity but deteriorate storage stability. Even when stored in a cold and dark place, the composition has a problem of gradually proceeding the curing.

To improve the curability on the surface, a method for solving the problem with addition curing is proposed. However, to achieve the storage stability, the addition reactivity at a room temperature have to be reduced. Thus, both of UV curing and heat curing are required (Patent Document 6).

CITATION LIST

Patent Literature

Patent Document 1: JP 2008-195931 A
Patent Document 2: JP 3894873 B
Patent Document 3: JP 2001-064593 A
Patent Document 4: JP 2005-040749 A
Patent Document 5: JP 2013-253166 A
Patent Document 6: JP 5735446 B

SUMMARY OF INVENTION

Technical Problem

The present invention has been made in view of the above-described circumstances. An object of the present invention is to provide a photocurable silicone composition having good storability, and good surface curability and deep-part curability in the air; an adhesive consisting of the photocurable silicone composition; and a cured material of the photocurable silicone composition.

Solution to Problem

To achieve the object, the present invention provides a photocurable silicone composition, comprising:

(A) an organopolysiloxane having at least one structure represented by the following general formula (1) in a molecule, (1)

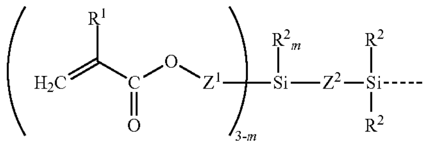

wherein "m" represents any of 0, 1, and 2, $R^1$ each represents a hydrogen atom or a methyl group being same as or different from each other, $R^2$ each represents a substituted or unsubstituted monovalent hydrocarbon group having 1 to 12 carbon atoms being same as or different from each other, $Z^1$ each represents a divalent hydrocarbon group having 1 to 10 carbon atoms being same as or different from each other and optionally having an oxygen atom in a chain, $Z^2$ represents an oxygen atom or a substituted or unsubstituted divalent hydrocarbon group having 1 to 10 carbon atoms, and a broken line represents a bond;

(B) an organohydrogenpolysiloxane having at least two hydrogen atoms bonded to a silicon atom in one molecule;

(C) a photo-radical polymerization initiator; and (D) a platinum-group metal catalyst to be activated by light having a wavelength of 200 to 500 nm.

The inventive photocurable silicone composition has excellent storability, and surface curability and deep-part curability in the air.

Preferably, the component (A) contains an organopolysiloxane represented by the following general formula (2), (2)

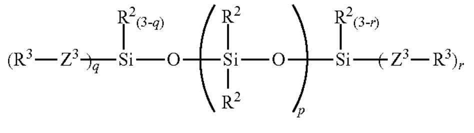

wherein "p" represents an integer of 10 or more, "q" and "r" represent an integer of 0 to 3, "q+r" represents an integer of 1 to 6, $Z^3$ each represents an oxygen atom or a substituted or unsubstituted divalent hydrocarbon group having 1 to 10 carbon atoms being same as or different from each other, $R^2$ each represents a substituted or unsubstituted monovalent hydrocarbon group having 1 to 12 carbon atoms being same as or different from each other, and $R^3$ represents the structure represented by the general formula (1).

The component (A) containing such a linear-chain siloxane yields a more flexible cured material, and thereby yields a useful composition for an adhesive, etc.

Further preferably, the $Z^1$ represents an alkylene group having 1 to 6 carbon atoms, and the $Z^2$ represents an oxygen atom.

The photocurable silicone composition containing such a component (A) yields an effective reaction between a free radical generated during decomposition of the component (C) and the component (A), and in addition, the activated component (D) can effectively proceed an addition-reaction between the component (A) and the component (B). Thus, the composition yields excellent adhesion strength and operability, and excellent surface curability.

The present invention also provides an adhesive consisting of the above photocurable silicone composition.

Such an adhesive can be cured with light irradiation by both of curing with radical polymerization and curing with addition reaction between the (meth)acryl group and Si—H. Therefore, curing with the photo-radical polymerization reaction within seconds can be achieved, and in addition, the addition reaction proceeds without heating to smoothly cure the composition even on the surface part.

The present invention also provides a cured material of the above photocurable silicone composition.

Since having excellent curability on the surface, such a cured material has no tackiness.

Advantageous Effects of Invention

As described above, the inventive photocurable silicone composition proceeds curing with both reactions of the radical polymerization reaction and the addition reaction between the (meth)acryl group and Si—H, which are triggered by light irradiation. This can yield excellent storability and achieve curing with the photo-radical polymerization reaction within seconds, and in addition, the addition reaction proceeds without heating to overcome uncuring on a surface part due to the oxygen inhibition.

DESCRIPTION OF EMBODIMENTS

As described above, required is a photocurable silicone composition having good storability, and good surface curability and deep-part curability in the air.

The present inventors have earnestly studied to achieve the above object, and consequently found that an organopolysiloxane having a (meth)acryl group is cured by a radical polymerization reaction with a photo-radical polymerization initiator and by an addition reaction between the (meth)acryl group and Si—H using a platinum-group metal catalyst to be activated by light can yield a photocurable silicone composition having good storability, and good surface curability and deep-part curability in the air. This finding has led to the completion of the present invention.

Specifically, the present invention is a photocurable silicone composition, comprising:

(A) an organopolysiloxane having at least one structure represented by the following general formula (1) in a molecule,

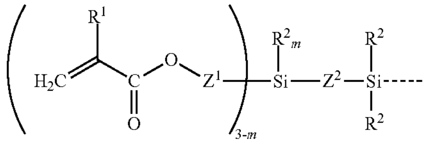
(1)

wherein "m" represents any of 0, 1, and 2, $R^1$ each represents a hydrogen atom or a methyl group being same as or different from each other, $R^2$ each represents a substituted or unsubstituted monovalent hydrocarbon group having 1 to 12 carbon atoms being same as or different from each other, $Z^1$ each represents a divalent hydrocarbon group having 1 to 10 carbon atoms being same as or different from each other and optionally having an oxygen atom in a chain, $Z^2$ represents an oxygen atom or a substituted or unsubstituted divalent hydrocarbon group having 1 to 10 carbon atoms, and a broken line represents a bond;

(B) an organohydrogenpolysiloxane having at least two hydrogen atoms bonded to a silicon atom in one molecule;

(C) a photo-radical polymerization initiator; and (D) a platinum-group metal catalyst to be activated by light having a wavelength of 200 to 500 nm.

Hereinafter, the present invention will be described in detail, but the present invention is not limited thereto.

[Photocurable Silicone Composition]

The inventive photocurable silicone composition contains the following components (A) to (D). Hereinafter, each component will be described in detail.

<Component (A)>

The component (A) is an organopolysiloxane having at least one structure represented by the following general formula (1) in the molecule. The component (A) is preferably an organopolysiloxane being a liquid having a viscosity at 25° C. of 10 mPa·s or more, or a solid.

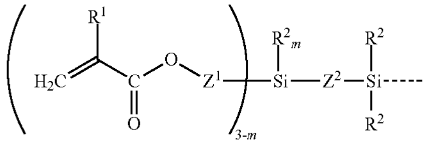
(1)

In the formula, "m" represents any of 0, 1, and 2. $R^1$ each represents a hydrogen atom or a methyl group being same as or different from each other. $R^2$ each represents a substituted or unsubstituted monovalent hydrocarbon group having 1 to 12 carbon atoms being same as or different from each other. $Z^1$ each represents a divalent hydrocarbon group having 1 to 10 carbon atoms being same as or different from each other and optionally having an oxygen atom in a chain. $Z^2$ represents an oxygen atom or a substituted or unsubstituted divalent hydrocarbon group having 1 to 10 carbon atoms. A broken line represents a bond.

$R^1$ represents a hydrogen atom or a methyl group. $R^1$ is preferably a methyl group, which facilitates to reaction with Si—H to form a Si—C bond with the terminal carbon atom, from the viewpoint of durability after curing.

Example of the substituted or unsubstituted monovalent hydrocarbon group having 1 to 12 carbon atoms represented by $R^2$ include: alkyl groups, such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, or a decyl group; aryl groups, such as a phenyl group, a tolyl group, a xylyl group, or a naphthyl group; aralkyl groups, such as a benzyl group, a phenylethyl group, or a phenylpropyl group; alkenyl groups, such as a vinyl group, an allyl group, a propenyl group, an isopropenyl group, a butenyl group, a hexenyl group, a cyclohexenyl group, or a octenyl group; and groups obtained from these groups by substituting a part or all of hydrogen atoms therein with a halogen atom, such as fluorine, bromine, and chlorine, and a cyano group. Examples of such substituted groups include a chloromethyl group, a chloropropyl group, a bromoethyl group, a trifluoropropyl group, and a cyanoethyl group. $R^2$ preferably has 1 to 8 carbon atoms, and is more preferably a methyl group and a phenyl group.

$Z^1$ represents a divalent hydrocarbon group having 1 to 10 carbon atoms optionally having an oxygen atom in the chain. $Z^1$ is preferably an alkylene group having 1 to 6 carbon atoms, and particularly preferably an alkylene group having 1 to 3 carbon atoms from the viewpoint of the durability after curing. Examples of such an alkylene group include a methylene group, an ethylene group, and trimethylene group. A part or all of hydrogen atoms in these hydrocarbon groups may be substituted with a halogen atom, such as fluorine, bromine, and chlorine, and a cyano group.

$Z^2$ represents an oxygen atom or a substituted or unsubstituted divalent hydrocarbon group having 1 to 10 carbon atoms. $Z^2$ is preferably an oxygen atom.

"m" represents 0, 1, or 2, and preferably 1 or 2.

The organopolysiloxane of the component (A) is not particularly limited as long as it has the structure represented by the general formula (1) in the molecule. The component (A) preferably contains an organopolysiloxane represented by the following general formula (2), and more preferably contains 50 mass % or more of the organopolysiloxane represented by the following general formula (2) in the component (A).

(2)

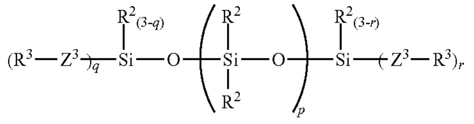

In the formula, "p" represents an integer of 10 or more. "q" and "r" represent an integer of 0 to 3, and "q+r" represents an integer of 1 to 6. $Z^3$ each represents an oxygen atom or a substituted or unsubstituted divalent hydrocarbon group having 1 to 10 carbon atoms being same as or different from each other. $R^2$ each represents a substituted or unsubstituted monovalent hydrocarbon group having 1 to 12 carbon atoms being same as or different from each other. $R^3$ represents the structure represented by the general formula (1).

$Z^3$ represents an oxygen atom or a substituted or unsubstituted divalent hydrocarbon group having 1 to 10 carbon atoms. Examples of the divalent hydrocarbon group having 1 to 10 carbon atoms include the groups same as the $Z^1$. Among these, $Z^3$ is preferably an alkylene group having 1 to 6 carbon atoms, and particularly preferably an alkylene group having 1 to 3 carbon atoms from the viewpoint of the durability after curing. $R^2$ each represents a substituted or unsubstituted monovalent hydrocarbon group having 1 to 12 carbon atoms being same as or different from each other. $R^3$ represents the structure represented by the general formula (1).

"p" represents an integer of 10 or more, preferably within a range of 10 to 2,000, and more preferably within a range of 100 to 1,000. This range yields a composition having good operability before curing and good flexibility after curing.

"q" and "r" represent an integer of 0 to 3, and "q+r" represents an integer of 1 to 6. "q+r" is preferably within a range of 2 to 6 from the viewpoint of curability.

Specific examples of the component (A) are described below.

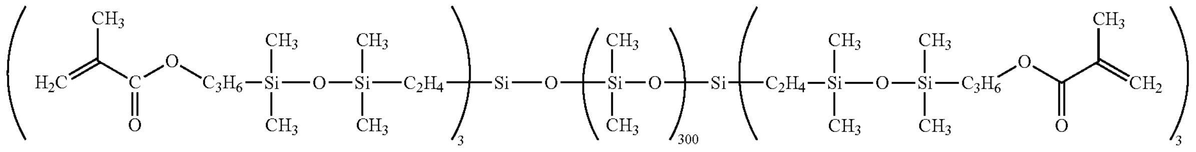

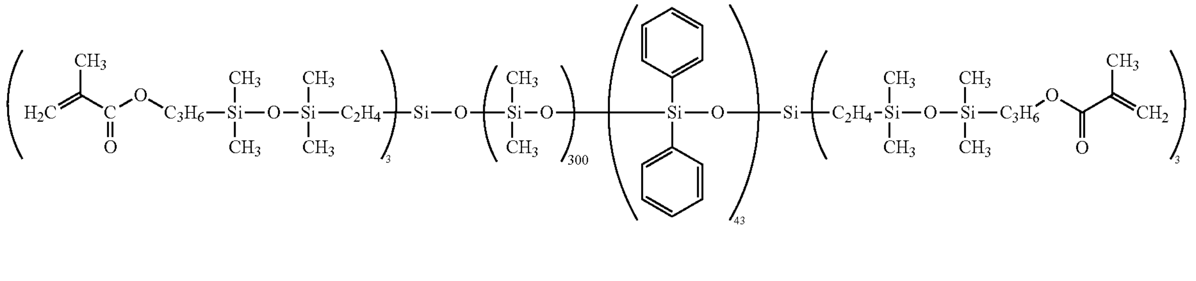

-continued

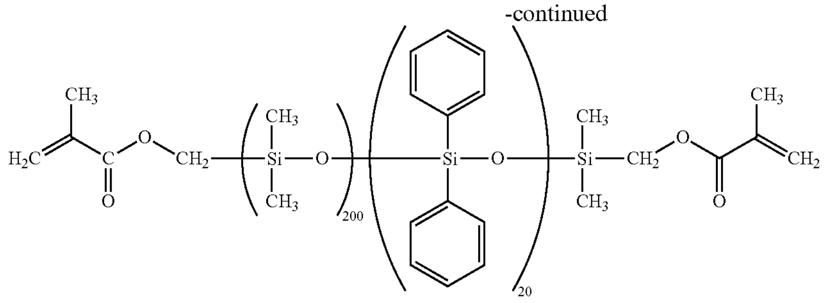

In the formulae, the order of the siloxane units may be any.

As the component (A), branched organopolysiloxanes composed of an MA unit, an M unit, and a Q unit, represented by the following formulae, are also exemplified.

(MA unit)

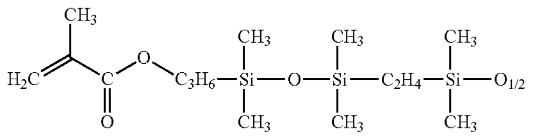

(M unit)

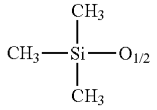

(Q unit)

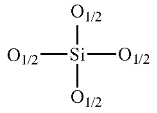

The component (A) may be used alone, or may be used in combination of two or more thereof.

<Component (B)>

The component (B) is an organohydrogenpolysiloxane having at least two hydrogen atoms bonded to a silicon atom in one molecule. The component (B) causes a hydrosilylation reaction (addition reaction of Si—H) with the component (A) in the presence of the catalyst of the component (D) to act as a crosslinker.

The component (B) has at least two, preferably 3 to 500, more preferably 3 to 200, particularly preferably 3 to 100, silicon atom-bonded hydrogen atoms (that is, Si—H groups) in one molecule. A number of silicon atoms in one molecule (or polymerization degree) of a used organohydrogenpolysiloxane is preferably 2 to 1,000, more preferably 3 to 300, and particularly preferably 4 to 150. The Si—H group may be positioned at any of a terminal of the molecular chain, a non-terminal of the molecular chain, or may be positioned at both thereof.

Preferably used as such an organohydrogenpolysiloxane is represented by the following average formula (3).

$$R^7_eH_fSiO_{(4-e-f)/2} \quad (3)$$

Specific examples of an organic group represented by $R^7$, bonded to a silicon atom, include a monovalent hydrocarbon group having no aliphatic unsaturated bond, etc. among the groups exemplified as $R^2$ in the component (A). The organic group is preferably an alkyl group having 1 to 8 carbon atoms, and an aryl group. The organic group is particularly preferably a methyl group and a phenyl group.

"e" and "f" represent a positive number satisfying $0.7 \le e \le 2.1$, $0.001 \le f \le 1.0$, and $0.8 \le e+f \le 3.0$, and preferably represent a positive number satisfying $1.0 \le e \le 2.0$, $0.01 \le f \le 1.0$, and $1.5 \le e+f \le 2.5$.

A viscosity at 25° C. of the component (B) is preferably 0.5 to 100,000 mPa·s, and particularly preferably 10 to 5,000 mPa·s. A molecular structure of such an organohydrogenpolysiloxane is not limited, and examples thereof include a linear-chain, branched chain, liner-chain partially having a branch, cyclic, and three-dimensional web structures.

Examples of the component (B) include 1,1,3,3-tetramethyldisiloxane, 1,3,5,7-tetramethylcyclotetrasiloxane, methylhydrogensiloxane cyclic copolymer, methylhydrogensiloxane-dimethylsiloxane cyclic copolymer, dimethylpolysiloxane blocked at both terminals of the molecular chain with dimethylhydrogensiloxy groups, methylhydrogenpolysiloxane blocked at both terminals of the molecular chain with trimethylsiloxy groups, dimethylsiloxane-methylhydrogensiloxane copolymer blocked at both terminals of the molecular chain with trimethylsiloxy groups, dimethylsiloxane-methylhydrogensiloxane copolymer blocked at both terminals of the molecular chain with dimethylhydrogensiloxy groups, methylhydrogensiloxane-diphenylsiloxane copolymer blocked at both terminals with trimethylsiloxy groups, methylhydrogensiloxane-diphenylsiloxane-dimethylsiloxane copolymer blocked at both terminals with trimethylsiloxy groups, methylhydrogensiloxane-dimethylsiloxane-diphenylsiloxane copolymer blocked at both terminals with dimethylhydrogensiloxy groups, a copolymer composed of a $(CH_3)_2HSiO_{1/2}$ unit, a $(CH_3)_3SiO_{1/2}$ unit, and a $SiO_{4/2}$ unit, a copolymer composed of a $(CH_3)_2HSiO_{1/2}$ unit and a $SiO_{4/2}$ unit, and a copolymer composed of a $(CH_3)_2HSiO_{1/2}$ unit, a $SiO_{4/2}$ unit, and a $(C_6H_5)_3SiO_{1/2}$ unit, etc.

Specific examples of the component (B) are described below.

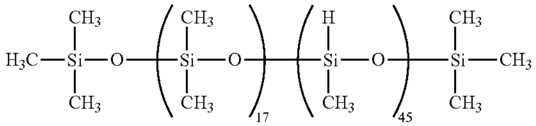

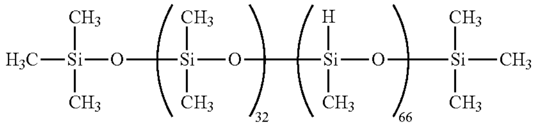

In the formulae, the order of the siloxane units may be any.

A blend amount of the component (B) is preferably 0.1 to 20 parts by mass, more preferably 0.5 to 20 parts by mass, and particularly preferably 1 to 10 parts by mass relative to 100 parts by mass of the component (A).

Such a range can inhibit surface tackiness due to insufficient curing of the composition, and does not inhibit curing with the photo-radical polymerization initiator.

When a component other than the component (A) has an addition-reactive carbon-carbon double bond that can cause hydrosilylation, such as an alkenyl group, such a component is preferably blended so that a molar ratio of a total number of the silicon atom-bonded hydrogen atoms (that is, Si—H groups) in the component (B) to a total number of addition-reactive carbon-carbon double bonds in the inventive composition is 0.01 to 5.0 times, preferably 0.1 to 4.0 times, and particularly preferably 0.5 to 3.0 times.

The organohydrogenpolysiloxane of the component (B) may be used alone, or may be used in combination of two or more thereof.

<Component (C)>

The component (C) is a photo-radical polymerization initiator to promote the curing with a radical polymerization reaction of the inventive photocurable silicone composition.

Examples of such a component (C) include benzoin and substituted benzoins (for example, benzoins substituted with an alkyl ester), Michler's ketone, benzophenone and substituted benzophenones, acetophenone and substituted acetophenones, and xanthone and substituted xanthones.

Commercially available products may also be used as the component (C). Examples thereof include 2,2-diethoxyacetophenone, 2,2-dimethoxy-1,2-diphenylethan one (Omnirad 651, manufactured by IGM Resins B.V.), 1-hydroxycyclohexyl phenyl ketone (Omnirad 184, manufactured by IGM Resins B.V.), 2-hydroxy-2-methyl phenyl-propan-1-one (Omnirad 1173, manufactured by IGM Resins B.V.), 2-hydroxy-1-{4-[4-(2-hydroxy-2-methyl-propionyl)-benzyl]-phenyl}-2-methyl-propan-1-one (Omnirad 127, manufactured by BASF and manufactured by IGM Resins B.V.), phenylglyoxilic acid methyl ester (Omnirad MBF, manufactured by IGM Resins B.V.), 2-methyl-1-[4-(methylthio)phenyl]-2-morpholinopropan-1-one (Omnirad 907, manufactured by IGM Resins B.V.), 2-benzyl-2-dimethylamino-1-(4-morpholinophenyl)-1-butanone (Omnirad 369, manufactured by IGM Resins B.V.), bis(2,4,6-trimethylbenzoyl)-phenylphosphine oxide (Omnirad 819, manufactured by IGM Resins B.V.), 2,4,6-trimethylbenzoyl-diphenylphosphine oxide (Omnirad TPO H, manufactured by IGM Resins B.V.), and a mixture thereof.

Among these, 2,2-diethoxyacetophenone, 2-hydroxy-2-methyl-1-phenyl-propan-1-one (Omnirad 1173, manufactured by IGM Resins B.V.), bis(2,4,6-trimethylbenzoyl)-phenylphosphine oxide (Omnirad 819, manufactured by IGM Resins B.V.), and 2,4,6-trimethylbenzoyl-diphenylphosphine oxide (Omnirad TPO H, manufactured by IGM Resins B.V.) are preferable from the viewpoint of compatibility with the component (A).

A blend amount of the component (C) is not limited as long as it is an amount to promote the radical polymerization, and preferably 0.1 to 10 parts by mass, more preferably 0.2 to 8 parts by mass, and particularly preferably 0.5 to 6 parts by mass relative to 100 parts by mass of the component (A).

<Component (D)>

The component (D), which is a platinum-group metal catalyst to be activated by light having a wavelength of 200 to 500 nm, is inactive under light shielding. The component (D) is a catalyst that changes to an active platinum catalyst by irradiation of light having a wave length of 200 to 500 nm to promote the hydrosilylation reaction between the addition-reactive carbon-carbon double bond in the component (A) and the Si—H group in the component (B).

Specific examples of such a component (D) include a ($\eta^5$-cyclopentadienyl)trialiphatic platinum compound and a derivative thereof. Among these, cyclopentadienyltrimethylplatinum complex, methylcyclopentadienyltrimethylplatinum complex, and a derivative in which these cyclopentadienyl groups are modified are particularly preferable.

Preferable examples of the component (D) also include bis(β-diketonato)platinum compounds. Among these, a bis(acetylacetonato)platinum compound and a derivative in which this acetylacetonato group is modified are particularly preferable.

A blend amount of the component (D) is not limited as long as it is an amount to promote the curing (hydrosilylation reaction) of the inventive photocurable silicone composition. The blend amount is preferably within a range of 0.01 to 1,000 ppm of the platinum-group metal atom in the present component (D) in mass unit, more preferably within a range of 0.05 to 500 ppm, and particularly preferably 0.05 to 100 ppm.

<Other Components>

The inventive photocurable silicone composition can contain other components to modify curing or uncuring characteristics desired in a specific usage. For example, an adhesion accelerator, such as (meth)acryloxypropyltrimethoxysilane, a trialkyl- or triaryl-isocyanurate, glycidoxypropyltrimethoxysilane, and vinyltrimethoxysilane can be used at 5 mass % or less relative to the inventive photocurable silicone composition. As the other optional components, a compound having a (meth)acryl group can be added at 30 mass % or less relative to the inventive photocurable silicone composition for a purpose of regulating a viscosity and regulating a hardness of the cured material. Examples of such a compound include polyethylene glycol di(meth)acrylate and isobornyl methacrylate. In addition, a non-(meth)acryl silicone diluent or a plasticizer can be used at 30 mass % or less relative to the inventive photocurable silicone composition. Examples of the non-(meth)acryl silicones may include an oil with trimethylsilyl terminals having a viscosity of 100 to 500 Pa·s and a silicone rubber. The non-(meth)acryl silicones can have co-curable group, such as a vinyl group.

Into the inventive photocurable silicone composition, an inorganic filler may be added. Example of such an inorganic filler include reinforcing silicas, such as fumed silica and crystalline silica. The silicas can be used with untreated (hydrophilic) or treated to be hydrophilic. In practice, any reinforcing fumed silica can be used.

[Preparation Method]

A method for preparing the inventive photocurable silicone composition is not particularly limited, and the inventive photocurable silicone composition can be prepared by mixing, stirring, dispersing, or the like each of the above components. An apparatus for mixing, stirring, or dispersing is not particularly limited, and a grinder, three rollers, ball mill, planetary mixer, beads mill, etc. that are equipped with stirring and heating apparatuses can be used. These apparatuses may be used in appropriate combination.

[Curing Method]

As described above, the inventive photocurable silicone composition can be cured by irradiating light with both of curing with radical polymerization and curing with the addition reaction between the (meth)acryl group and the Si—H. Thus, curing with the photo-radical polymerization reaction within seconds can be achieved, and in addition, the addition reaction proceeds without heating to smoothly cure the surface part. Therefore, the inventive photocurable silicone composition can be preferably used for adhesive, etc.

A light source used for curing the inventive photocurable silicone composition is not particularly limited, but an UV-light source is useful. In particular, examples thereof include a common mercury vapor lump designed to emit ultraviolet-ray energy within various ultraviolet-ray wavelength region. For example, as a useful UV-ray wavelength range, 220 to 400 nm can be preferably used. These light sources are also effective to activate the platinum catalyst of the component (D).

An irradiation intensity of the used light source during the curing of the inventive photocurable silicone composition is preferably 30 to 2,000 mW/cm$^2$, and an irradiation dose is preferably 150 to 10,000 mJ/cm$^2$. A temperature during the irradiation is preferably 10 to 60° C., and more preferably 20 to 40° C.

The hydrosilylation with the component (D) activated by light is typically rather slower than a photo-radical polymerization reaction, and proceeds in several minutes to several days at a room temperature. After the activation by light, the hydrosilylation may be proceeded by heating up to approximately 200° C. for shortening the time.

[Usage]

The inventive photocurable silicone composition can be applied on each substrate to use as a coating agent or an adhesive. Usable substrates are a composite material, a metal member, a plastic member, a ceramic member, a casing for electric use, electronic use, optical use, etc., or substrates used in the fields of coating, injecting, adhering, and sealing a member.

The present invention provides an adhesive consisting of the above-described photocurable silicone composition.

Such an adhesive can be cured by light irradiation with both of curing with radical polymerization and curing with addition reaction between the (meth)acryl group and the Si—H. Thus, curing within seconds with the photo-radical polymerization reaction can be achieved, and in addition, the addition reaction proceeds without heating to smoothly cure the composition even on the surface part. Therefore, the adhesive can exhibit an excellent function as an adhesive.

The inventive photocurable silicone composition is exposed with light to yield a cured material of the photocurable silicone composition. This cured material is entirely cured on both of the surface and the deep part.

Such a cured material has excellent curability on the surface, thus has no tackiness.

EXAMPLE

Hereinafter, the present invention will be described specifically with showing Examples and Comparative Examples, but the present invention is not limited to the following Examples. Note that the molecular weight is a weight-average molecular weight with standard polystyrene conversion by gel permeation chromatography (GPC). The viscosity at 25° C. is a measured value with a rotary viscosimeter.

Abbreviations of each siloxane unit have means as follows.

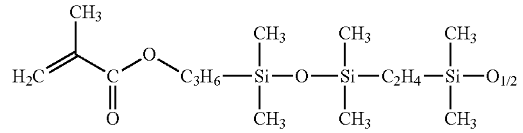

(MA unit)

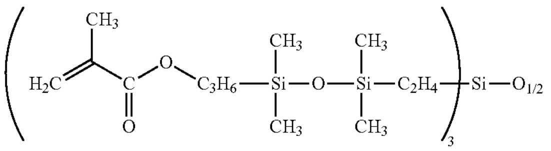

(3MA unit)

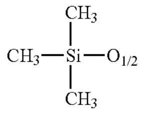

(M unit)

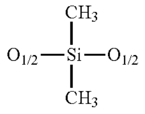

(D unit)

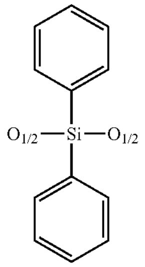

($D^{2\Phi}$ unit)

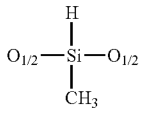

($D^{H}$ unit)

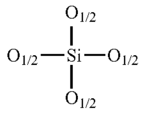

(Q unit)

Examples 1 to 4 and Comparative Examples 1 to 4

The following components were prepared to prepare silicone compositions having a composition shown in Table 1.

Component (A):

(A-1)

Organopolysiloxane having a constitution unit ratio of 3MA unit:D unit=2:300 and having a viscosity at 25° C. of 1.9 Pa·s.

(A-2)

Organopolysiloxane having a constitution unit ratio of 3MA unit:D unit:$D^{2\Phi}$) unit=2:390:43 and having a viscosity at 25° C. of 10.0 Pa·s.

(A-3)

Organopolysiloxane having a constitution unit ratio of MA unit:M unit:Q unit=1:4:6, having a weight-average molecular weight of 5,000, and is a solid at 25° C.

Component (B)

Organohydrogenpolysiloxane having a constitution unit ratio of M unit:D unit:$D^H$ unit=2:17:45 and having a viscosity at 25° C. of 50 mPa·s.

Component (C)

2-Hydroxy-2-methyl-1-phenyl-propan-1-one (Omnirad 1173, manufactured by IGM Resins B.V.)

Component (D):

(D-1)

A toluene solution of methylcyclopentadienyltrimethylplatinum complex having a platinum element content of 0.5 mass %.

(D-2)

A 2-(butoxyethoxy)ethyl acetate solution of bis(acetylacetonato)platinum (II) having a platinum element content of 0.5 mass %.

(D-3)

A toluene solution of a 1,3-divinyl-1,1,3,3-tetramethyldisolxane platinum complex having a platinum element content of 0.5 mass %.

Component (E)

Addition reaction inhibitor: 1-ethynylcyclohexanol

TABLE 1

| | | Example | | | | Comparative Example | | | |
|---|---|---|---|---|---|---|---|---|---|
| | | 1 | 2 | 3 | 4 | 1 | 2 | 3 | 4 |
| Blend amount | (A-1) | 100 | — | — | 100 | 100 | 100 | 100 | 100 |
| | (A-2) | — | 100 | 75 | — | — | — | — | — |
| | (A-3) | — | — | 25 | — | — | — | — | — |
| | (B) | 4.8 | 2.9 | 6.6 | 4.8 | 4.8 | 4.8 | 4.8 | 4.8 |
| | (C) | 1 | 1 | 1 | 1 | 1 | — | 1 | 1 |
| | (D-1) | 0.5 | 0.5 | 0.5 | — | — | 0.5 | — | — |
| | (D-2) | — | — | — | 0.5 | — | — | — | — |
| | (D-3) | — | — | — | — | — | — | 0.1 | 0.1 |
| | (E) | — | — | — | — | — | — | 0.01 | 0.2 |

On the photocurable silicone compositions obtained in Examples 1 to 4 and Comparative Examples 1 to 4, the following evaluation was performed. Table 2 shows the results. The compositions were cured in the air with irradiation of ultraviolet ray of 3,000 mJ/$cm^2$ by using Lump H (M) 06-L-61, manufactured by EYE GRAPHICS CO., LTD. A thickness of the cured material was regulated to 6.0 mm.

[Storability]

The composition was left to stand under an environment at 25° C., light-shielded, and sealed, and flowability of the composition was observed on the next day. A flowable sample was judged as "Yes", and a cured sample was judged as "No".

[Curability]

A property of the composition immediately after the light irradiation was observed. A cured sample was judged as "Good", and a sample that remained liquid was judged as "Poor".

[Hardness]

After the light irradiation, the composition was left to stand under an environment at 25° C. for 24 hours. A hardness under the environment at 25° C. immediately thereafter was measured by using a type-A durometer.

[Tackiness]

After the light irradiation, the composition was left to stand under an environment at 25° C. for 24 hours. A surface tackiness under the environment at 25° C. immediately thereafter was evaluated by touching with finger.

TABLE 2

| | Example | | | | Comparative Example | | | |
|---|---|---|---|---|---|---|---|---|
| | 1 | 2 | 3 | 4 | 1 | 2 | 3 | 4 |
| Storability | Yes | Yes | Yes | Yes | Yes | Yes | No | Yes |
| Curability | Good | Good | Good | Good | Good | Poor | Good | Good |
| Hardness | 26 | 23 | 43 | 23 | 8 | 26 | 26 | 15 |
| Tackiness | No | No | No | No | Yes | No | No | Yes |

As shown in Table 2, it is found that the photocurable silicone compositions of Examples 1 to 4 exhibit the features of: good storability under light-shielded environment at a room temperature; good curability with appropriate light irradiation enough to form a solid during the irradiation; and no tackiness on the surface of the obtained cured material because the addition reaction proceeds at a room temperature.

Meanwhile, Comparative Example 1, which used no inventive component (D), had poor curability on the surface, and tackiness remained. Comparative Example 2, which used no inventive component (C), was not solidified immediately after the light irradiation. Comparative Example 3, which used the platinum component to be heat-activated instead of the inventive component (D), exhibited uncontrolled curability at a room temperature to exhibit poor storability. Comparative Example 4, which used the increased amount of the addition-reaction inhibitor of the component (E) to improve the storability of Comparative Example 3, did not proceed the addition reaction between the (meth)acryl group and the Si—H to deteriorate the surface curability.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A photocurable silicone composition, comprising:

(A) an organopolysiloxane represented by the following general formula (2), (2)

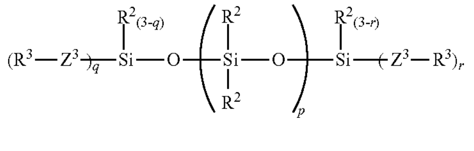

wherein "p" represents an integer of 10 or more, "g" and "r" represent an integer of 0 to 3, "q+r" represents an integer of 1 to 6, $Z^3$ each represents a substituted or unsubstituted divalent hydrocarbon group having 1 to 10 carbon atoms being same as or different from each other, $R^2$ each represents a substituted or unsubstituted monovalent hydrocarbon group having 1 to 12 carbon atoms being same as or different from each other, and $R^3$ represents a structure represented by the following general formula (1);

(1)

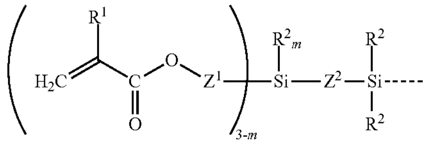

wherein "m" represents any of 0, 1, and 2, $R^1$ each represents a hydrogen atom or a methyl group being same as or different from each other, $R^2$ each represents a substituted or unsubstituted monovalent hydrocarbon group having 1 to 12 carbon atoms being same as or different from each other, $Z^1$ each represents a divalent hydrocarbon group having 1 to 10 carbon atoms being same as or different from each other and optionally having an oxygen atom in a chain, $Z^2$ represents an oxygen atom or a substituted or unsubstituted divalent hydrocarbon group having 1 to 10 carbon atoms, and a broken line represents a bond;

(B) an organohydrogenpolysiloxane having at least two hydrogen atoms bonded to a silicon atom in one molecule;

(C) a photo-radical polymerization initiator; and (D) a platinum-group metal catalyst to be activated by light having a wavelength of 200 to 500 nm.

2. The photocurable silicone composition according to claim 1, wherein the $Z^1$ represents an alkylene group having 1 to 6 carbon atoms, and the $Z^2$ represents an oxygen atom.

3. An adhesive, consisting of the photocurable silicone composition according to claim 1.

4. An adhesive, consisting of the photocurable silicone composition according to claim 2.

5. A silicone cured material, comprising a cured material of the photocurable silicone composition according to claim 1.

6. A silicone cured material, comprising a cured material of the photocurable silicone composition according to claim 2.

* * * * *